Figure 1:
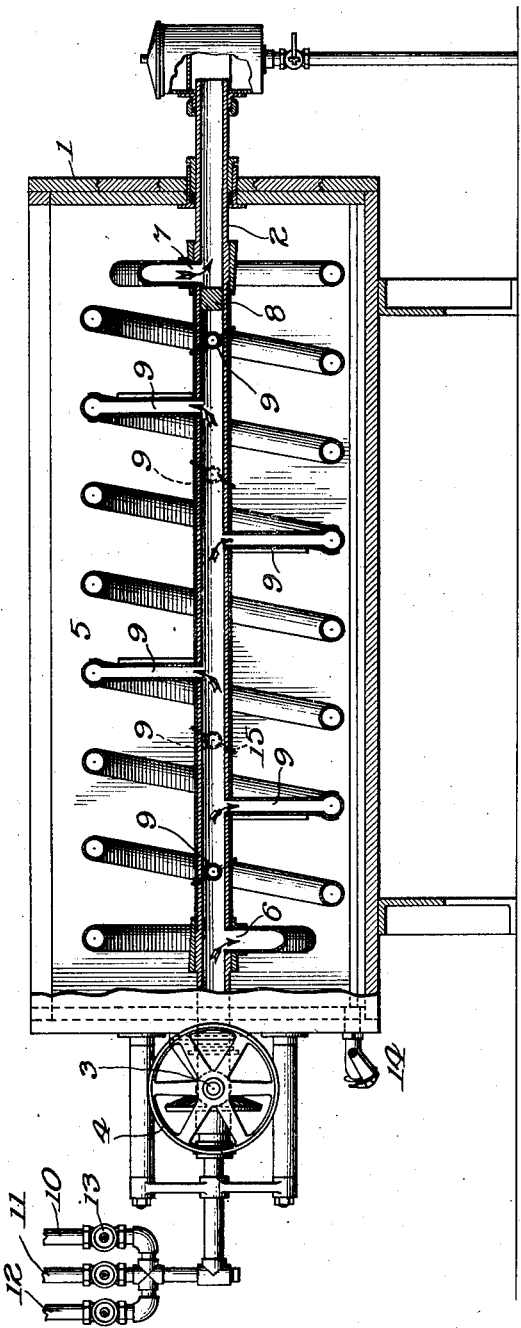

T. L. VALERIUS.
MEANS FOR TEMPERING LIQUIDS.
APPLICATION FILED JULY 5, 1913.

1,091,097.

Patented Mar. 24, 1914.

Witnesses:
J. C. Devick
George L. Chindahl

Inventor:
Theodore L. Valerius
By Luther L. Miller
Atty.

UNITED STATES PATENT OFFICE.

THEODORE L. VALERIUS, OF FORT ATKINSON, WISCONSIN, ASSIGNOR TO CREAMERY PACKAGE MANUFACTURING COMPANY, OF CHICAGO, ILLINOIS, A CORPORATION OF ILLINOIS.

MEANS FOR TEMPERING LIQUIDS.

1,091,097. Specification of Letters Patent. Patented Mar. 24, 1914.

Application filed July 5, 1913. Serial No. 777,375.

*To all whom it may concern:*

Be it known that I, THEODORE L. VALERIUS, a citizen of the United States, residing at Fort Atkinson, in the county of Jefferson and State of Wisconsin, have invented certain new and useful Improvements in Means for Tempering Liquids, of which the following is a specification.

In tempering liquids, as, for instance, in ripening cream and pasteurizing milk and cream, it is customary to place the liquid in a vat provided with a rotatable element in the form of a coil or screw supported upon and communicating with a tubular shaft. The tempering fluid is admitted to one end of the shaft, and, after flowing through the coil or screw, is discharged from the other end of the shaft. The shaft is rotated in order to cause the coil or screw to agitate the liquid, and thus temper the same uniformly.

In previous constructions, the tempering fluid has been admitted to the first convolution only of the spiral. By the time the fluid has passed through the first two or three convolutions of the spiral, its energy has been largely lost, and, therefore, the passage of the fluid through the remaining convolutions of the spiral has been practically ineffectual. For instance, when the liquid in the vat is being heated, the condensing surface is so large that only the first few coils or convolutions are hot. Moreover, the first few convolutions of the spiral are likely to be excessively hot, with consequent danger that the albumin of the milk will coagulate upon said convolutions.

This invention contemplates an improvement in the tempering of liquids, by providing the spiral at intervals in its length with feeding connections to the hollow shaft, thereby causing all parts of the spiral to become effective in tempering the liquid. By reason of the fact that all parts of the spiral coil are efficient, the length of the coil may be considerably reduced, if desired, thus effecting an important economy in the construction of the machine. The shortening of the coil increases the pitch thereof, and thus increases the efficiency of the coil in agitating the milk or cream. By the use of a plurality of feeding connections between the coil and the tubular shaft, no part of the coil is as hot as are the first few convolutions of a coil having but one feeder, and, therefore, the danger of coagulating the albumin of the milk is obviated.

If it be desired to increase the agitating efficiency of the coil by the addition of blades set at an angle to the plane of the shaft, such blades may conveniently be supported upon the various feeder connections.

Figure 2:
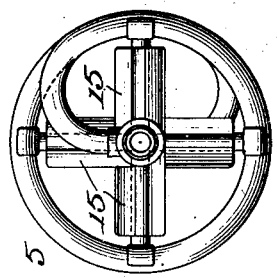
Figure 3:
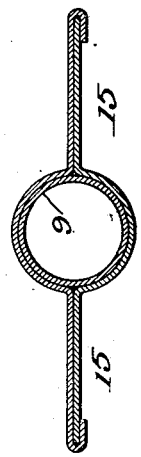

The accompanying drawings illustrate one of the various forms in which the invention may be embodied, Figure 1 being a side view, largely in section. Fig. 2 is the right-hand end view of the rotatable tempering element. Fig. 3 is a detail view of an agitating device.

In the drawing, 1 indicates a vat which may be of any suitable size and form. Rotatably mounted in bearings in the ends of the vat is a tubular shaft 2 arranged to be rotated by means of a bevel gear connection with a drive shaft 3, the latter shaft carrying a drive pulley 4. A hollow spiral tempering member 5 is supported upon and communicates with the shaft 2. Said spiral member may be of any suitable construction. Herein it is shown as formed of a coiled pipe, the ends of the pipe being connected to the shaft 2 at 6 and 7 so as to establish communication between the interior of the shaft and the interior of the coil.

8 is a plug secured in the shaft 2 adjacent to the connection 7 and between said connection and the connection 6.

Intermediate the connections 6 and 7 is a suitable number of feeder connections 9. Herein I have indicated eight such intermediate connections, but it will be understood that the number may be varied to correspond with the length and pitch of the spiral, and the purposes for which the machine is intended to be used. The intermediate feeder connections 9 serve to support the spiral and connect it to the shaft, said feeder connections thus taking the place of the supporting arms heretofore employed.

Tempering fluids, such as steam, cold water, and brine, may be admitted to one end of the rotatable shaft 2 through the supply pipes 10, 11 and 12, each of said pipes being provided with a shut-off valve 13. The fluid discharged from the other end of the shaft 2 may be disposed of in any well-known or suitable way.

After treatment, the liquid may be drained from the vat 1 through the valved outlet 14.

It will be seen that by reason of the provision of a plurality of feeder connections, all parts of the spiral member are supplied from the shaft 2 with tempering liquid of the maximum effectiveness. When steam is being used, steam flows through all of the feeder connections and thus maintains all portions of the spiral at substantially uniform temperature. The flow through the various feeder connections is less rapid than if all the steam were obliged to pass through one feeder connection, thus avoiding overheating of the end of the spiral adjacent to the inlet end of the shaft 2.

As heretofore stated, the length of the spiral may be less than has heretofore been necessary, since all parts of the spiral are efficient in tempering the liquid. Such shortening of the spiral permits of an increase in the pitch, if desired, and thus increases the agitating effectiveness of the spiral. If more agitation is desired than would be produced by the spiral alone, agitating blades 15 may be attached to the feeder connections 9. These blades may be set at such an angle as to cause movement of the liquid in the same direction as do the coils of the spiral; or the blades may be set to move the liquid in the direction opposite to the direction of flow caused by the spiral; or, if preferred, some of the blades may be set to produce movement of the liquid in one direction and the remainder of the blades to produce movement in the opposite direction.

It will be seen that by means of my invention the spiral member is caused to heat or cool the liquid more rapidly than has heretofore been possible; scorching of the milk is avoided; the agitating efficiency of the spiral is increased; and a saving in the length of the pipe required is effected.

I claim as my invention:

1. In a machine for tempering liquid, the combination of a vat, a tubular central shaft rotatably mounted in said vat, a spirally coiled pipe surrounding said shaft within said vat, the ends of said pipe communicating with said shaft, a plug in said shaft intermediate the ends of said spiral pipe, and a plurality of independent tubular arms extending radially outward from said central shaft to said spiral pipe and each communicating at opposite ends with said shaft and said pipe, said tubular arms serving to support the spiral pipe from the central shaft and also serving as feeder connections for distributing the tempering fluid along the length of said spiral pipe.

2. In a machine for tempering liquid, the combination of a vat, a tubular central shaft rotatably mounted in said vat, a spirally coiled pipe surrounding said shaft within said vat, the ends of said pipe communicating with said shaft, a plug in said shaft intermediate the ends of said spiral pipe, a plurality of independent tubular arms extending radially outward from said central shaft to said spiral pipe and each communicating at opposite ends with said shaft and said pipe, and individual agitating blades fixed on said tubular arms, said blades being angularly disposed with respect to the path of motion of said arms, whereby to agitate the fluid being tempered.

In testimony whereof I affix my signature in presence of two witnesses.

THEODORE L. VALERIUS.

Witnesses:
 HUBERT E. LEMKE,
 H. H. CURTIS.